United States Patent [19]
Greene

[11] Patent Number: 5,282,598
[45] Date of Patent: Feb. 1, 1994

[54] CONTAINER HOLDER

[76] Inventor: Barry N. Greene, P.O. Box 10541, Beverly Hills, Calif. 90213

[21] Appl. No.: 917,584

[22] Filed: Jul. 21, 1992

[51] Int. Cl.$^5$ .............................................. A47K 1/08
[52] U.S. Cl. ................................ 248/311.2; 248/310; 224/275; 224/42.42; 224/42.01; 297/194
[58] Field of Search ............... 224/275 X, 42.42 X, 224/42.45 R, 42.01 X, 901; 297/188, 189, 191, 194; 248/311.2, 313, 316.6, 316.7, 909, 911, 310, 903

[56] References Cited

U.S. PATENT DOCUMENTS

| | | | |
|---|---|---|---|
| 2,640,595 | 6/1953 | Byford | 224/275 X |
| 2,704,114 | 3/1955 | Williams | 297/194 |
| 2,846,201 | 8/1958 | Mermelstein | 248/311.2 X |
| 3,977,582 | 8/1976 | McMahon | 224/901 X |
| 4,300,709 | 11/1981 | Page, Jr. | 224/275 |
| 4,678,154 | 7/1987 | McFarland | |
| 4,721,276 | 1/1988 | Moss | 248/311.2 |
| 4,801,060 | 1/1989 | Thompson | 224/275 |
| 4,905,714 | 3/1990 | Drennen | 224/901 X |
| 5,000,511 | 3/1991 | Shichijo et al. | 297/191 |
| 5,048,734 | 9/1991 | Long | 224/901 X |

Primary Examiner—David A. Scherbel
Assistant Examiner—Korie H. Chan
Attorney, Agent, or Firm—Poms, Smith, Lande & Rose

[57] ABSTRACT

A container holder which may be used to hold or support a beverage container in an automobile by inserting an elongated member with a securing portion between the back rest and seat cushion of a seat, or between the back rests of two adjacent seats. The elongated member with securing portion may be releasably or permanently attached to a receptacle portion used to hold the beverage container. Also, the container holder may have a receptacle portion that can be varied in size to hold different sizes of containers. The container holder can be used on top of a seat cushion or on top of an arm rest.

19 Claims, 3 Drawing Sheets

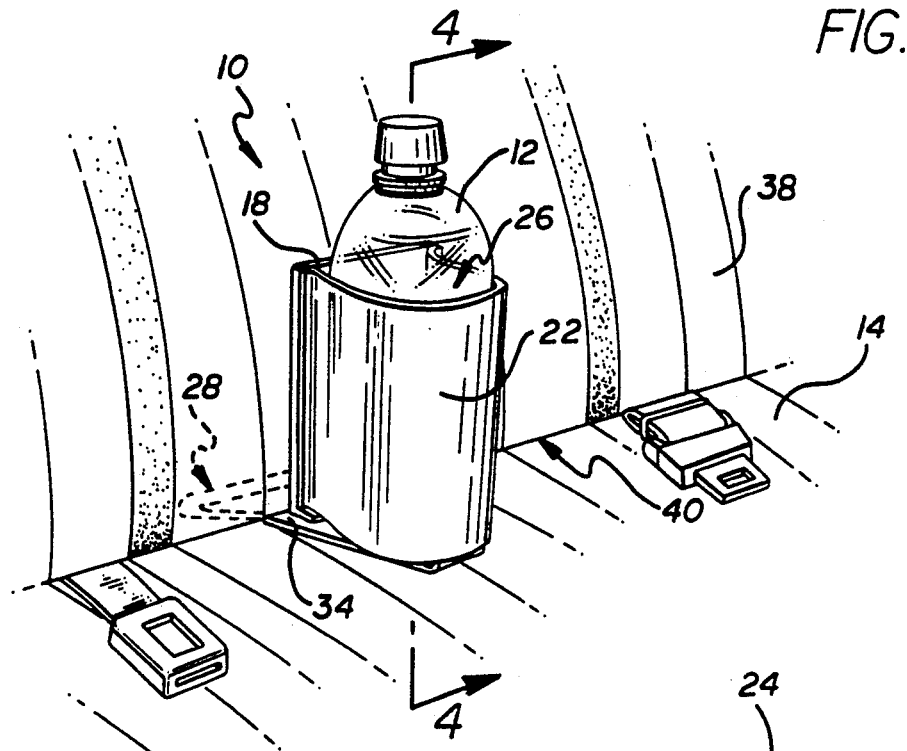
FIG. 1
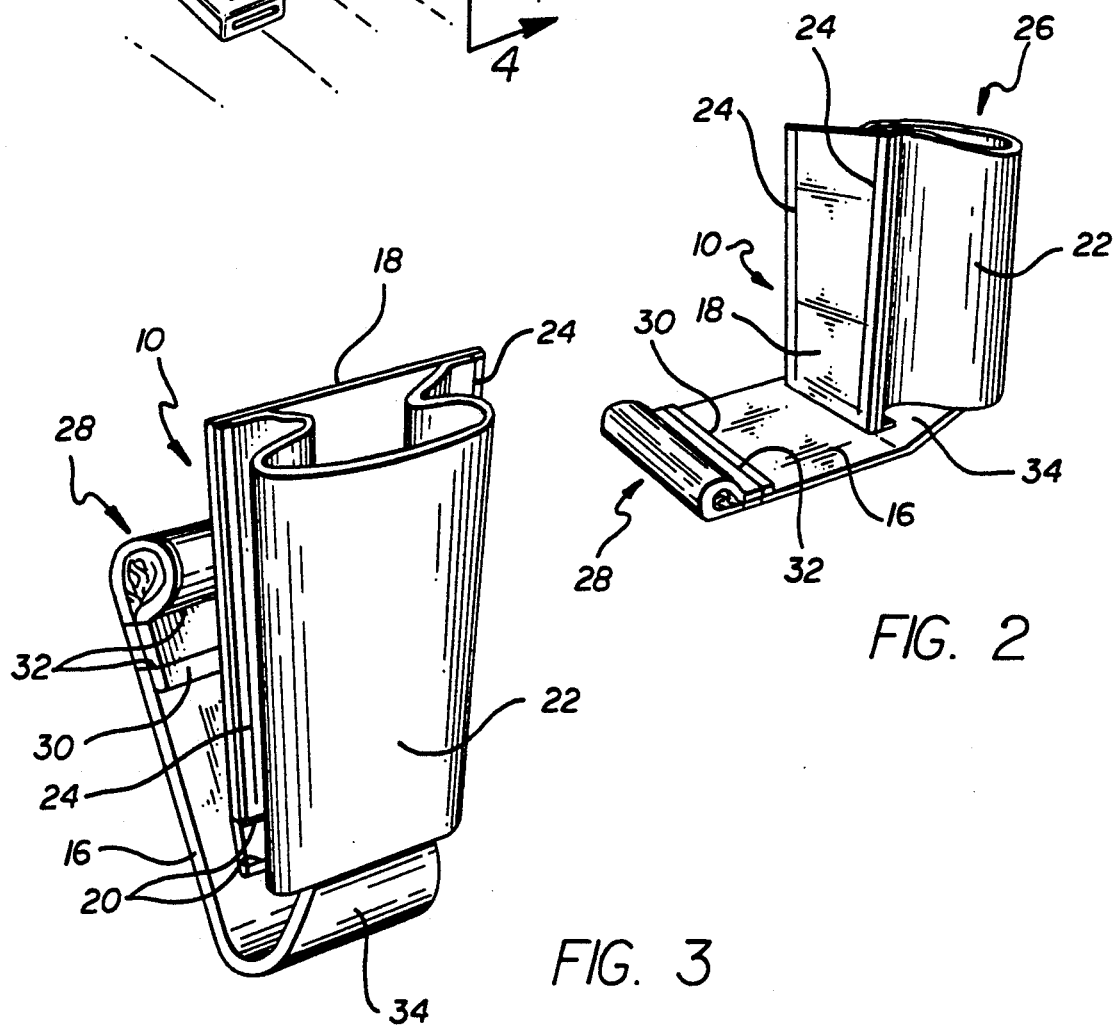
FIG. 2
FIG. 3

CONTAINER HOLDER

BACKGROUND OF THE INVENTION

The present invention relates generally to container holders, and more particularly to a container holder which may be used to hold a beverage container in an automobile by inserting an elongated member of the holder between the back rest and seat cushion of a seat, or between the back rests of two adjacent seats.

Different types of holders have been designed for the purpose of holding a beverage container in an automobile. For example, U.S. Pat. No. 2,640,595, issued to Byford on Jun. 2, 1953, discloses an article holder. The holder has a flap 7 that may be inserted between the back rest and seat cushion of an automobile seat. However, the holder is made out of a stiff material such as plastic or sheet metal, which makes it difficult to carry the holder, for example, in luggage. Also, the carrying receptacles of the holder are relatively short. As a result, cans or bottles inserted into the receptacles may fly out of the receptacles when an automobile is brought to a quick stop.

U.S. Pat. No. 4,678,154, issued to McFarland on Jul. 7, 1987, discloses another beverage container holder. As shown in FIG. 5 of this patent, the holder is held in place by arm 18 inserted between a back rest and seat cushion of a seat. However, arm 18 will not prevent the holder from moving forward when a motor vehicle stops quickly. As such, beverage may spill from a container inserted into the holder.

SUMMARY OF THE INVENTION

It is an object of this invention to provide a container holder which may be used to hold a beverage container securely in place inside an automobile.

It is another object of this invention to provide a container holder which may be removably attached to an automobile seat.

It is still another object of this invention to provide a container holder that can hold different sizes of containers.

It is still another object of this invention to provide a container holder which may be used with different automobile seats.

It is still another object of this invention to provide a container holder which may be used in conjunction with the arm rest of an automobile seat.

It is still another object of this invention to provide a container holder which is easy to carry, for example, in luggage.

It is still another object of this invention to provide a container holder that is economical to manufacture.

These and other objects and advantages are attained by a container holder which may be used to hold or support a beverage container in an automobile by inserting an elongated member with a securing portion between the back rest and seat cushion of a seat, or between the back rests of two adjacent seats. The elongated member with securing portion may be releasably or permanently attached to a receptacle portion used to hold the beverage container. Also, the container holder may have a receptacle portion that can be varied in size to hold different sizes of containers. The container holder can be used on top of a seat cushion or on top of an arm rest.

The various features of the present invention will be best understood together with further objects and advantages by reference to the following description of the preferred embodiments taken in conjunction with the accompanying drawings.

BRIEF DESCRIPTION OF THE DRAWINGS

FIG. 1 is a front perspective view of a container holder of the present invention showing a bottle being supported by the holder which is removably attached to an automobile seat;

FIG. 2 is a rear perspective view of the container holder of FIG. 1;

FIG. 3 is a front perspective view of the container holder of FIG. 1 showing the container holder in a folded condition;

DESCRIPTION OF THE PREFERRED EMBODIMENTS

Figure 4:
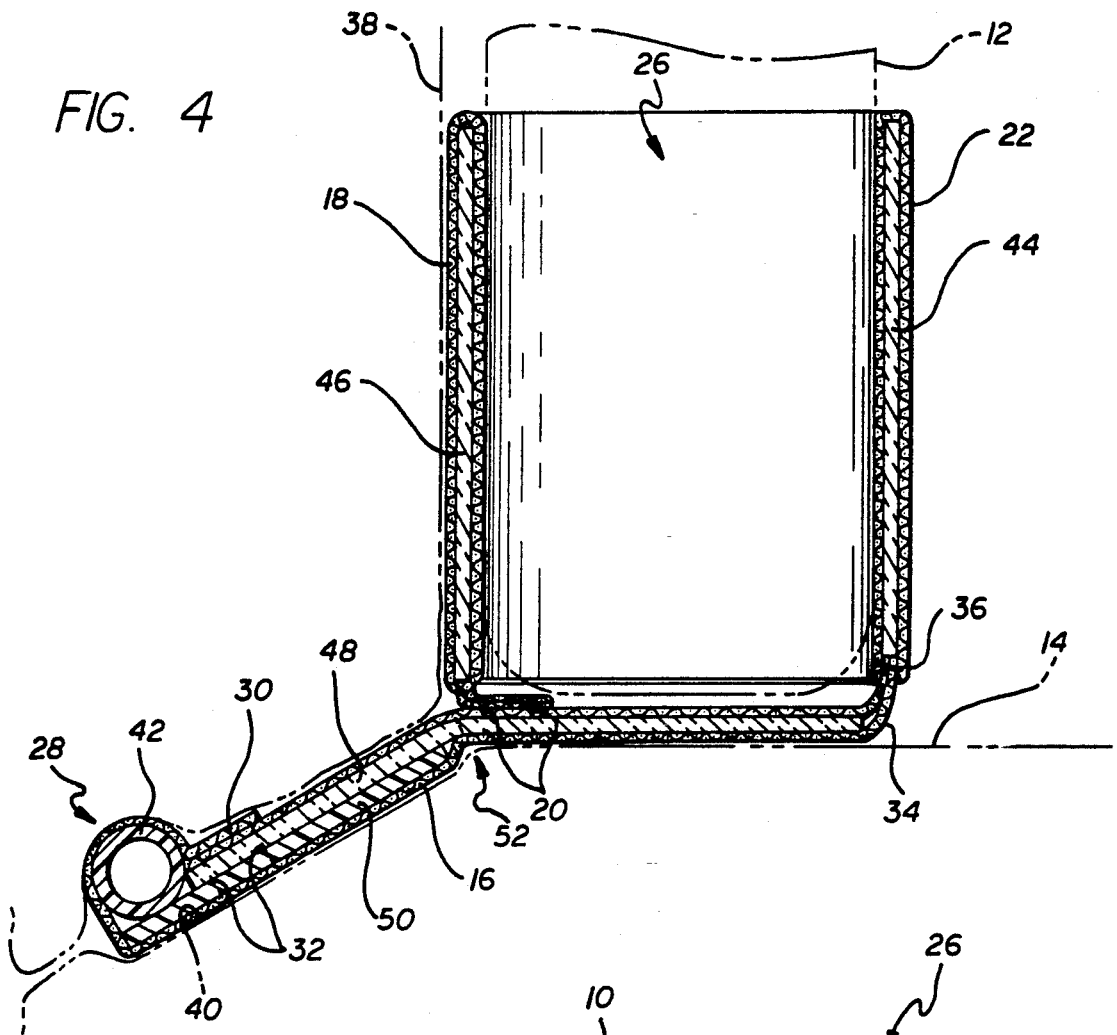
FIG. 4 is a cross-sectional view taken in the direction of arrows 4—4 shown in FIG. 1.

The following specification taken in conjunction with the drawings sets forth the preferred embodiments of the present invention in such a manner that any person skilled in the art can make and use the invention. The embodiments of the invention disclosed herein are the best modes contemplated by the inventor for carrying out his invention in a commercial environment, although it should be understood that various modifications can be accomplished within the parameters of the present invention.

FIG. 1 shows a container holder 10 of the present invention holding a bottle 12 placed on a seat cushion 14 of a seat such as an automobile seat. The container holder 10 has an elongated member 16, and a support portion 18 attached to member 16 at one end thereof by stitches 20 (see FIGS. 3 and 4), or by any other suitable means of attachment, such as adhesive, snaps, or the like. As illustrated in FIGS. 1 through 3, a receptacle portion 22 is also attached at ends thereof to a front side of support portion 18 by stitches 24 (see FIGS. 2 and 3), or by any other suitable means, so as to form a receptacle space 26 having top and bottom open ends.

The receptacle portion 22 is preferably made out of a flexible material such as nylon, leather, or the like. However, any suitable material may be used for receptacle portion 22. As discussed below, when a flexible material is used, the receptacle portion 22 may be folded into a generally compact configuration as shown in FIG. 3 for transport, etc.

The elongated member 16 has a securing portion 28 at a distal end thereof, which may be formed by folding or looping over an end portion 30 of member 16 and securing the end portion 30 by stitches 32, or any other suitable means, as best illustrated in FIGS. 3 and 4. As discussed below, the securing portion 28 may be flexible or rigid. The other end portion 34 of elongated member 16 is attached to the receptacle portion 22 by stiches 36 (see FIG. 4), or any other suitable means.

As illustrated in FIGS. 1 and 4, a bottle 12, or any container such as a beverage container, may be placed into receptacle space 26 of the receptacle portion 22, so that the bottle 12 is resting on top of end portion 34 and on top of seat cushion 14. As best shown in FIG. 4, elongated member 16 and securing portion 28 may be forced into space 40 between the seat cushion 14 and back rest 38 of the seat, so that the support portion 18 is resting against the back rest 38.

Securing portion 28 is sized so that the container holder 10 will be securely held in place on the seat, and the elongated member 16 will not move out of space 40 when, for example, an automobile comes to a sudden stop. As shown in FIG. 4, end portion 30 of member 16 is looped or folded over a cylindrical member 42, which may be rigid or flexible. If member 42 is flexible, this facilitates folding the container holder 10 into a compact configuration as illustrated in FIG. 3. However, a more rigid member 42 made out of plastic, or the like, will make it more difficult to dislodge the elongated member 16 from space 40, which helps to hold the container holder 10 more securely in place between seat cushion 14 and back rest 38.

It is important to note that any shape, size or configuration may be used for member 42, and member 42 may be as flexible or rigid as desired.

As shown in FIG. 4, receptacle portion 22 and support portion 18 may have insulating liners or inserts 44 and 46, respectively, therein for helping to keep a beverage inside the container or bottle 12 hot or cold. The inserts 44 and 46 may be as flexible or rigid as desired. Also, the inserts 44 and 46 may provide the dual functions of insulating and stiffening the holder 10.

Liners or inserts 48 and 50 may also be used inside elongated member 16 as shown in FIG. 4. Such inserts 48 and 50 may provide insulation and/or may be used to stiffen elongated member 16. However, inserts 48 and 50 may be as flexible or rigid as desired. In addition, the container holder 10 may be used with any or all of inserts 44 through 50, and the inserts may have any degree of flexibility or stiffness. Also, insert 48 may be comprised of two parts, a first part forward of fold line or location 52 shown in FIG. 4, and a second part in back of fold line 52. Any type of insulating material may be used for inserts 44 through 50 such as fiber, plastic, vinyl, polyethylene, or the like.

If the receptacle holder 22, support portion 18, and elongated member 16 are made out of flexible material, then it is less likely that a beverage would spill out of an open container 12, or that the container 12 would fall out of the receptacle holder 10 when an automobile comes to a sudden stop. This is true because a flexible container holder 10 allows the holder 10 to slightly move back and forth and sideways, absorbing some of the shock, when sudden stopping occurs. A rigid holder would not move as much as a flexible holder during sudden stops, which may cause a bottle to fall out of the holder, or liquid to spill out of a container in the holder.

As shown in FIG. 3, the container holder 10 may be easily folded into a compact configuration that may be conveniently carried, for example, in baggage. Elongated member 16 may be easily folded or rotated toward support portion 18 at fold line or location 52 shown in FIG. 4, where the thickness of member 16 suddenly decreases in size from the thickness of the portion of member 16 that fits into space 40 between the seat cushion 14 and back rest 38.

The container holder 10 may be used by pushing or forcing elongated member 16 and securing portion 28 into space 40 between seat cushion 14 and back rest 38 until support portion 18 comes into contact with back rest 38. A container or bottle 12 may then be placed into the receptacle space 26 of the holder 10 so that the bottom of the bottle rests on top of end portion 34 of member 16, and the bottle is supported by seat cushion 14.

Figure 5:
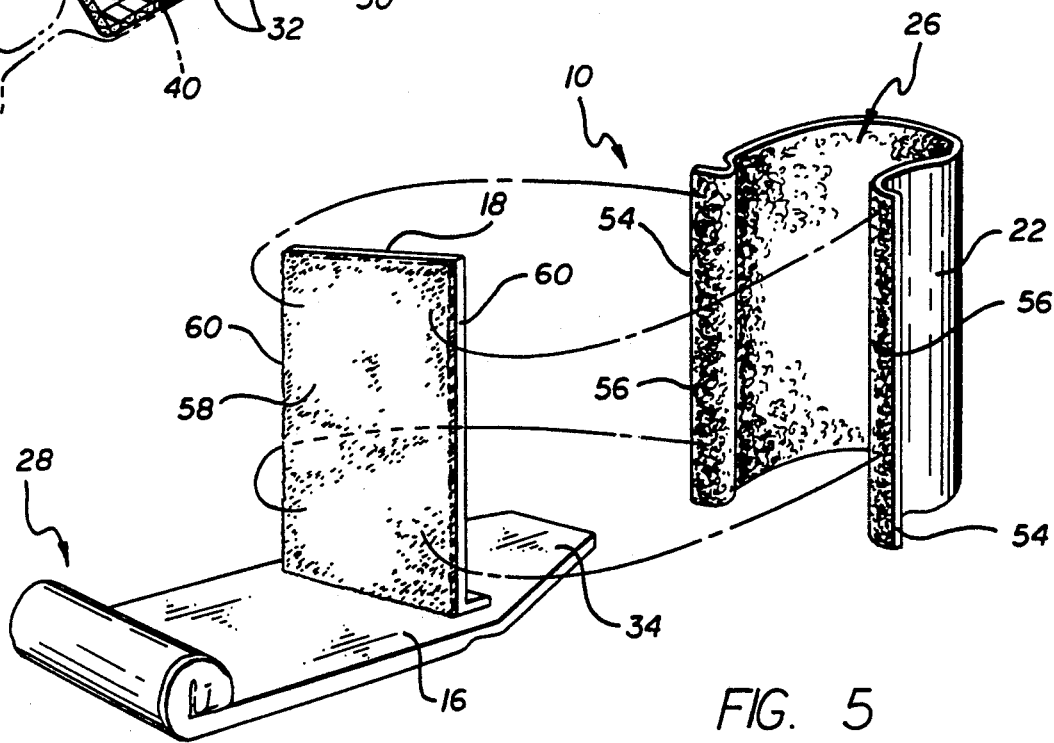
FIG. 5 is an exploded rear perspective view of another embodiment of the container holder having a receptacle portion with ends that may be releasably attached to a support portion in order to form different size receptacle spaces for holding different size containers.

FIG. 5 shows another embodiment of the container holder 10 having a receptacle portion 22 with ends 54 that may be releasably attached to support portion 18 in order to form different size receptacle spaces 26 for holding different size containers 12. Support portion 18 has a fastening portion 58 on a rear side thereof, and receptacle portion 22 has a corresponding fastening portion 56 on an inside surface thereof encompassing receptacle space 26.

Ends 54 of the receptacle portion 22 may be looped around the vertical edges 60 of support portion 18, and releasably attached to portion 18 for the purpose of forming any size receptacle space 26 which will fit any size container 12. Ends 54 are releasably attached to portion 18 by engaging or meshing fastening portion 56 adjacent ends 54 to a corresponding portion of fastening portion 58 on the back side of support portion 18. Alternatively, fastening portion 58 may be attached to the front side of support portion 18, if desired.

Fastening portions 56 and 58, as used herein, are intended to mean any cooperative releasable fastening portions such as a mat and pad arrangement marketed under the trademark VELCRO. The mat is composed of a carrier strip having a plurality of looped fibers which releasably engage a plurality of hooked upstanding filaments carried by the pad. However, any desirable fastening portions or means may be used. For example, snaps or other types of fasteners may be used to releasably attach the receptacle portion 22 to support portion 18.

Figure 6:
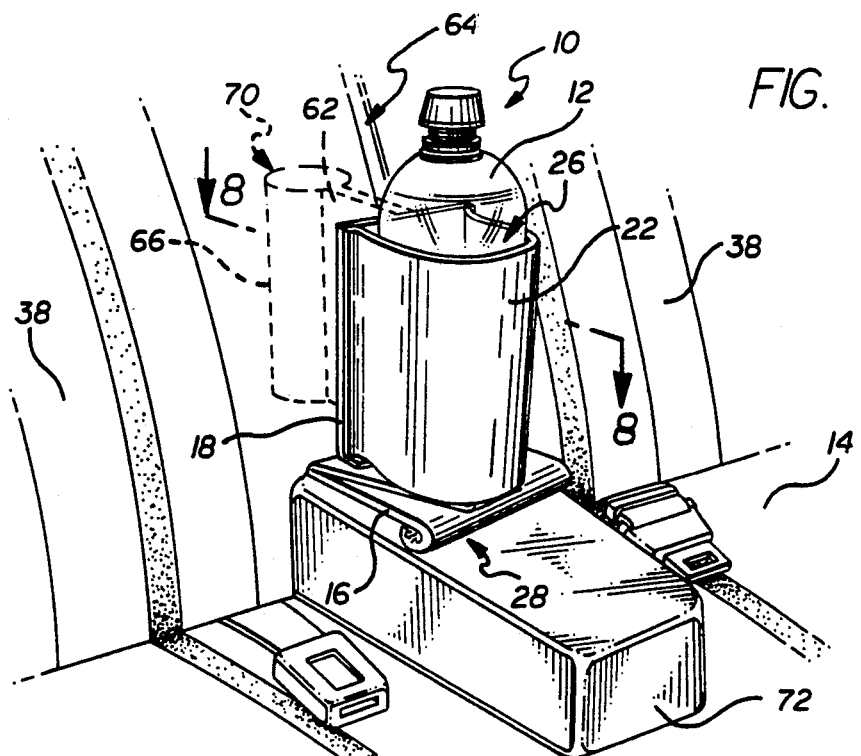
FIG. 6 is a front perspective view of another embodiment of the container holder showing a bottle being supported by the holder which is resting on top of an arm rest and removably attached between the back rests of an automobile seat.
Figure 7:
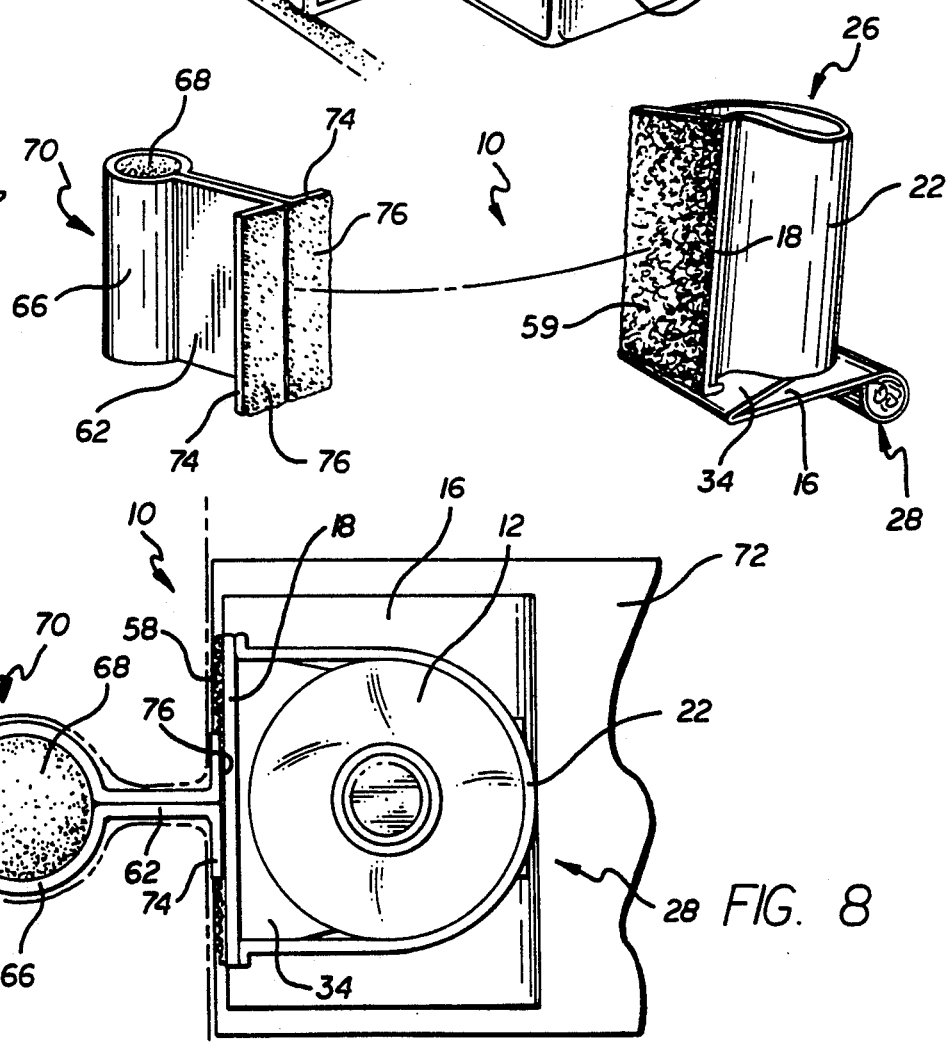
FIG. 7 is an exploded rear perspective view of the container holder of FIG. 6 showing how an elongated member with a flexible securing portion may be releasably attached to the supporting portion of the holder.
Figure 8:
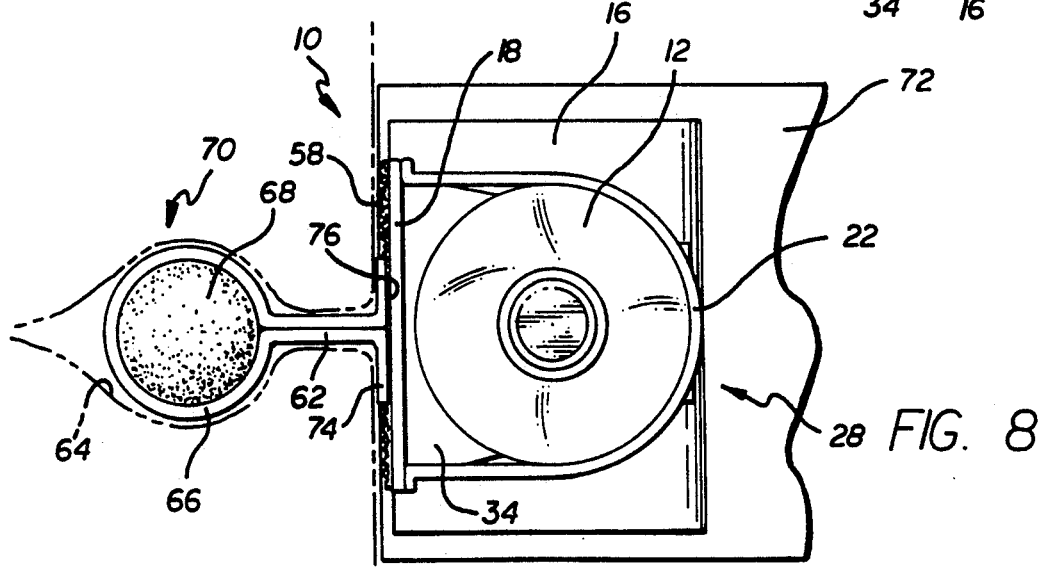
FIG. 8 is a top plan view taken in the direction of arrows 8—8 shown in FIG. 6.

FIGS. 6 through 8 show another embodiment of the container holder 10 which has an elongated member 62 that may be releasably inserted into a space 64 between the back rests 38 of adjacent automobile seats. As shown in FIGS. 6 and 7, elongated member 16 may be folded along fold line 52 (see FIG. 4) so that member 16 is positioned under receptacle portion 22 and its end portion 34. This allows elongated member 62 to be releasably attached to support portion 18, as discussed below.

Elongated member 62 has two flaps 74 at one end thereof and a flexible securing portion 70 at the other end thereof. Fastening portions 76 are attached to the front sides of the flaps 74. Portions 76 are used with fastening portion 59 (like fastening portions 56 and 58; see FIG. 5) to releasably attach elongated member 62 to the back side of support portion 18 when elongated member 16 is folded under the receptacle portion 22.

VELCRO may be used for portions 59 and 76. However, any other type of fastening means may be used for portions 59 and 76, as discussed above. Alternatively, the container holder 10 may be manufactured without the portion of the elongated member 16 that is located in back of fold line 52, or that folds under receptacle portion 22, and member 62 may be permanently attached to support portion 18.

The flexible securing portion 70 is formed by a portion 66 of member 16 that fits around a flexible material 68 such as rubber, foam rubber, open cell polyurethane foam, or the like. However, any flexible material may be used, and the material may have any desired degree of flexibility. The diameter of flexible securing portion 70 shown in FIGS. 6 through 8 is preferably in the range of from about one-half to about three-quarters inches. Also, flexible securing portion 70 may have any desirable configuration such as circular, rectangular, elliptical, etc. Alternatively, flexible material 68 may be directly attached to member 62, eliminating the need to use portion 66. Any type of material or construction may be used for flexible securing portion 70. The container holder is generally flexible enough to permit a passenger to sit in the same seat where the container holder is located.

After elongated member 16 is folded under receptacle portion 22 and elongated member 62 is releasably attached to support portion 18, the container holder 10 may be placed on top of an arm rest 72 of an automobile, and elongated member 62 and flexible securing portion 70 may be pushed or forced into space 64 between the back rests 38 until support portion 18 and flaps 74 come into contact with the back rests. If an automobile seat does not have an arm rest 72, then the container holder 10 may be placed on top of the seat cushion(s) 14 and flexible portion 70 may be pushed into space 64. Container or bottle 12 may be placed into receptacle space 26 after the container holder 10 is attached to the automobile seat(s) as shown in FIGS. 6 and 8.

The flexible securing portion 70 is sized so that the container holder 10 will be securely held in place on the seat or arm rest 72, and the elongated member 62 will not move out of space 64 when an automobile comes to a sudden stop. As such, securing portions 28 and 70 provide sufficient gripping action or frictional resistance to securely hold the container holder 10 in place.

It is important to note that the container holder 10 shown in FIGS. 6 through 8 may also be used without elongated member 62 and flexible securing portion 70, or may be used like the container holders 10 shown in FIGS. 1 through 5. Also, the receptacle portion 22 shown in FIGS. 6 through 8 may be releasably attached to support portion 18, as illustrated in FIG. 5.

The above description discloses the preferred embodiments of the present invention. However, persons of ordinary skill in the art are capable of numerous modifications once taught these principles. Accordingly, it will be understood by those skilled in the art that changes in form and details may be made to the above-described embodiments without departing from the spirit and scope of the invention.

I claim:

1. A container holder for holding a beverage container and for use with a seat, said seat having a seat cushion and a back rest, said container holder comprising:

an elongated member having securing means at one end thereof;
a support portion rotatably attached to said elongated member; and
a sheet of flexible material attached to said support portion, said sheet adapted (a) to be folded and moved toward said support portion into a generally compact configuration, and (b) to be unfolded to form a receptacle space capable of holding said beverage container, whereby in use, said elongated member is adapted to be removably inserted between said seat cushion and said back rest in order to position said support portion and said beverage container, when placed in said receptacle space, in a generally upward and generally perpendicular direction relative to said seat said securing means for holding said elongated member between said seat cushion and said back rest, and when not in use said elongated member and said support portion are adapted to be rotated toward each other in order to provide a generally overall compact configuration for said container holder when said sheet of flexible material is folded into said generally compact configuration.

2. The container holder of claim 1 wherein said elongated member extends under said sheet of flexible material, so that the other end of said elongated member is attached to said sheet of flexible material and said beverage container rests on top of said elongated member when placed in said receptacle space.

3. The container holder of claim 1 wherein said sheet of flexible material is removably attached to said support portion so that said receptacle space may be varied in size.

4. The container holder of claim 3 wherein said sheet of flexible material and said support portion have cooperating fastening portions.

5. The container holder of claim 1 wherein said securing means is flexible.

6. The container holder of claim 1 wherein said securing means is rigid.

7. A container holder for holding a beverage container and for use with a seat, said seat having a seat cushion and a back rest, said container holder comprising:

an elongated member having a securing portion at one end thereof;
a support portion attached to said elongated member; and
a sheet of flexible material attached to said support portion, said sheet adapted (a) to be folded and moved toward said support portion into a generally compact configuration, and (b) to be unfolded to form a receptacle space capable of holding said beverage container, said elongated member adapted to be removably inserted between said seat cushion and said back rest in order to position said support portion and said beverage container, when placed in said receptacle space, in a generally upward direction, said securing portion adapted to hold said elongated member between said seat cushion and said back rest, said elongated member and said support portion adapted to be rotated toward each other in order to provide a generally overall compact configuration for said container holder when said sheet of flexible material is folded into said generally compact configuration, said elongated member and said sheet of flexible material each include two layers of material and have inserts disposed therein between said layers.

8. The container holder of claim 1 wherein said elongated member and said support portion may be rotated along a common fold line.

9. A container holder for holding a beverage container and for use with a seat, said seat having a seat cushion and a back rest, said container holder comprising:
   an elongated member adapted to be removably inserted between said seat cushion and said back rest;
   means for holding said elongated member between said seat cushion and said back rest;
   a support portion rotatably attached to said elongated member; and
   a flexible receptacle portion attached to said support portion, said receptacle portion adapted (a) to be folded and moved toward said support portion into a generally compact configuration, and (b) to be unfolded during use to form a receptacle space capable of holding said beverage container so that said beverage container said receptacle portion, and said support portion are positioned in a generally upward and generally perpendicular direction relative to said seat as said elongated member is inserted between said seat cushion and said back rest, when said holder is not in use, said elongated member and said support portion is adapted to be rotated toward each other in order to provide a generally overall compact configuration for said container holder when said flexible receptacle portion is folded into said generally compact configuration.

10. The container holder of claim 9 wherein said flexible receptacle portion comprises a sheet of flexible material attached to said support portion.

11. The container holder of claim 10 wherein said holding means is attached to one end of said elongated member, and said elongated member extends under said sheet of flexible material, so that the other end of said elongated member is attached to said sheet of flexible material.

12. The container holder of claim 9 wherein said flexible receptacle portion is removably attached to said support portion so that said receptacle space may be varied in size in order to hold different sizes of said beverage containers.

13. The container holder of claim 12 wherein said sheet of flexible material and said support portion have cooperating fastening means.

14. A container holder for holding a beverage container and for use with two seats, each of said seats having a seat cushion and a back rest, said container holder comprising:
   a first elongated member adapted to be removably inserted between said seat cushion and said back rest;
   a first securing portion attached to one end of said first elongated member, said first securing portion adapted to hold said first elongated member between said seat cushion and said back rest;
   a support portion attached to said first elongated member;
   a flexible receptacle portion attached to said support portion adapted to hold said beverage container;
   a second elongated member adapted to be removably inserted between two of said back rests positioned adjacent to each other, said second elongated member being removably attached to said support portion; and
   a second securing portion attached to one end of said second elongated member, said second securing portion adapted to hold said second elongated member between said adjacent back rests.

15. The container holder of claim 14 wherein said flexible receptacle portion comprises a sheet of flexible material adapted (a) to be folded into a generally compact configuration, and (b) to form a receptacle space capable of holding said beverage container.

16. The container holder of claim 14 wherein said first elongated member extends under said flexible receptacle portion, so that the other end of said first elongated member is attached to said flexible receptacle portion.

17. The container holder of claim 14 wherein said second elongated member and said support portion have cooperating fastening portions.

18. The container holder of claim 14 wherein said flexible receptacle portion is removably attached to said support portion.

19. The container holder of claim 14 wherein said flexible receptacle portion and said support portion have cooperating fastening portions.

* * * * *